(12) United States Patent
Gage et al.

(10) Patent No.: US 8,543,644 B2
(45) Date of Patent: Sep. 24, 2013

(54) URL-BASED STICKY ROUTING TOKENS USING A SERVER-SIDE COOKIE JAR

(75) Inventors: Christopher A. S. Gage, Raleigh, NC (US); John Hind, Raleigh, NC (US); Marcia L. Peters, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/535,878

(22) Filed: Jun. 28, 2012

(65) Prior Publication Data

US 2013/0007225 A1    Jan. 3, 2013

Related U.S. Application Data

(62) Division of application No. 09/557,708, filed on Apr. 25, 2000, now Pat. No. 8,239,445.

(51) Int. Cl.
*G06F 15/16* (2006.01)

(52) U.S. Cl.
USPC .......................................... 709/203; 709/217

(58) Field of Classification Search
USPC ................................................. 709/203, 217
See application file for complete search history.

(56) References Cited

U.S. PATENT DOCUMENTS

| | | | | |
|---|---|---|---|---|
| 5,875,296 A * | 2/1999 | Shi et al. | | 726/5 |
| 6,041,357 A * | 3/2000 | Kunzelman et al. | | 709/228 |
| 6,076,108 A * | 6/2000 | Courts et al. | | 709/227 |
| 6,098,093 A * | 8/2000 | Bayeh et al. | | 709/203 |
| 6,185,598 B1 * | 2/2001 | Farber et al. | | 709/200 |
| 6,374,300 B2 * | 4/2002 | Masters | | 709/229 |
| 6,772,333 B1 * | 8/2004 | Brendel | | 713/153 |
| 6,886,044 B1 * | 4/2005 | Miles et al. | | 709/238 |
| 7,188,181 B1 * | 3/2007 | Squier et al. | | 709/228 |
| 8,239,445 B1 * | 8/2012 | Gage et al. | | 709/203 |

* cited by examiner

*Primary Examiner* — Kristie Shingles
(74) *Attorney, Agent, or Firm* — Steven M. Greenberg, Esq.; Carey, Rodriguez, Greenberg & O'Keefe

(57) ABSTRACT

A method, system and program product are presented for enabling a session, as defined by a series of related transactions to perform a unit of work, to be created between a client and a particular server where the server is managed by a dispatcher. Modifications to the Uniform Resource Locator (URL) are used to create a method of transferring information form the client to the server. The server implements a server-side storage area (cookie jar) to temporarily store information about the client and the session so that the client is routed to the same server for successive messages in the same session and no reliance is made upon an ability by the client to store or return cookies.

25 Claims, 7 Drawing Sheets

Unmodified:

201  http://www.ibm.com/sales/index

Modified:                              205

203  http://www.ibm.com/X@%3.as3.cx.A24/sales/index

Unmodified:
201 http://www.ibm.com/sales/index

Modified:
203 http://www.ibm.com/X@%3.as3.cx.A24/sales/index

| spec. server | date/time stamp | key | checksum |
|---|---|---|---|
| 207 | 209 | 211 | 213 |

Fig. 2

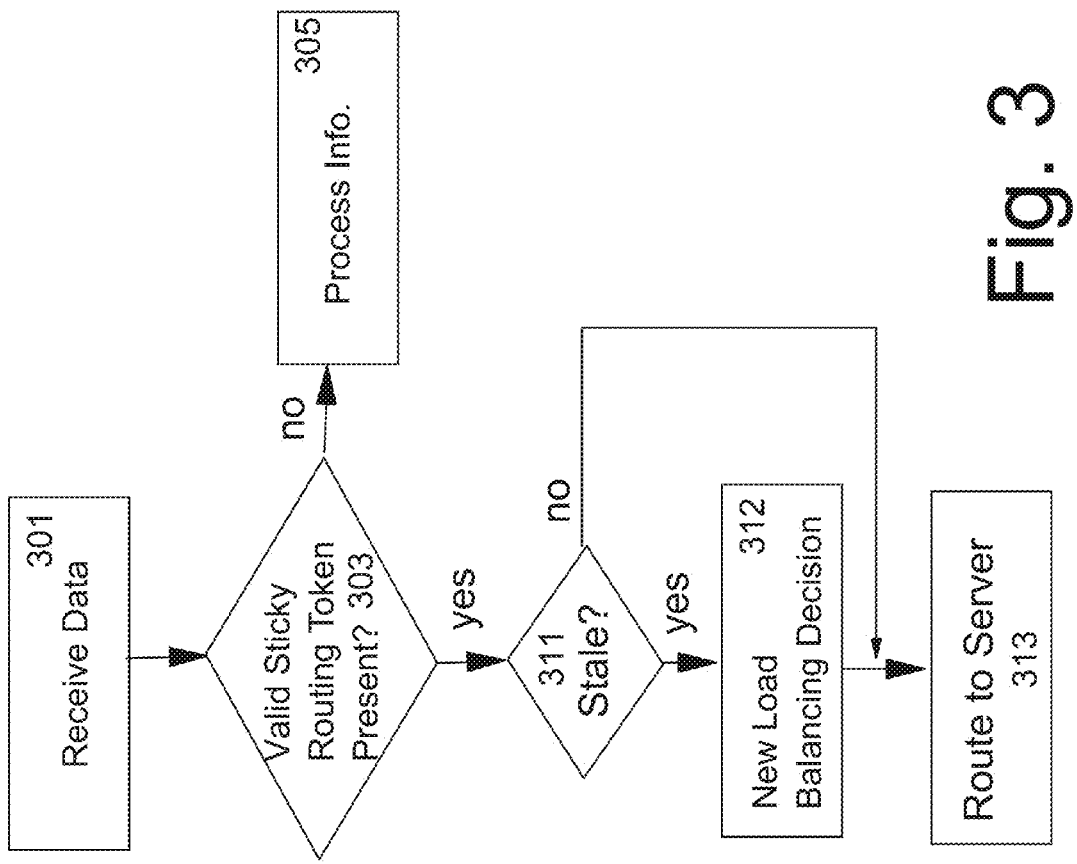

URL-BASED STICKY ROUTING TOKENS USING A SERVER-SIDE COOKIE JAR

This application is a Divisional of U.S. Pat. No. 8,239,445, filed Apr. 25, 2000, entitled "URL-BASED STICKY ROUTING TOKENS USING A SERVER-SIDE COOKIE JAR," the entirety of which is incorporated herein by reference.

BACKGROUND OF THE INVENTION

Through the 1990s, computer networks have grown exponentially. The Internet and the worldwide web have allowed everyone access to extraordinary amounts of information. They have also allowed people to conduct much of their day-to-day business, such as shopping or research using the Internet. During the 1999 shopping season, several large department and toy stores did more business while their stores were actually closed than when they were opened; this was due to their presence on the Internet. Their Internet web sites allowed their customers to look at the products they carry, search for particular items, read about the items, place orders and view delivery information all after the children were tucked quietly in bed. This came as quite a surprise to a large portion of the industry. Merchants had to increase the size and number of their servers to support all of the traffic from the home users. Several had to install significant amounts of new hardware such as network dispatchers to route requests to their servers to redundant or back-up servers so that the response time to the users did not become unbearable.

This is just one of the many examples of how the Internet is growing and how the access to information over the Internet is impacting society today. Users are becoming accustomed to receiving almost instantaneous response from computer networks and will not tolerate delays. As the number of users of the Internet grows, the number of redundant servers and network dispatchers managing these servers also must increase to maintain the quality of service that the customers demand. Network dispatchers are used to manage requests to a server, and distribute the work among several redundant servers, using a predetermined load-balancing methodology. A typical network dispatcher system is shown in FIG. 6. When the end user device 601 requests information from a server that has a front-end network dispatcher 603, the network dispatcher receives the request and routes it to one of the redundant back-end servers 605, 607, 609. If the network dispatcher 603 subsequently receives another request from the end user device 601, it will go through its selection process again to maintain the continuous load balancing. This is the function of a network dispatcher as it was designed.

The use of the traditional network dispatcher can become a problem when a user, once routed to a server for a first request, must consistently be routed to that same server for repeat requests due to the collection of information. This is so, in the merchant case, where a user comes into the merchant's web site and begins to place an order. Once the first item is placed into a shopping basket, the items must be remembered so that the user can continue to shop and place a successful order.

More specifically, suppose that a cluster of web servers provide equivalent services, front-ended by a network load balancer. The load balancer's job is to route inbound packets to the least-busy server, based on decision-making mechanisms that are beyond the scope of this discussion. A simplified version of this is shown in FIG. 1 where a cellular phone 101 is accessing information on redundant servers 109 using a wireless link 115 to a cellular tower 105, then a land link 117 to a dispatcher 107, then to the information servers 109, while a notebook computer 103 is also accessing information on the same servers 109. The problem becomes how to load balance given that a client, such as the cellular phone 101, must return to a particular server in the cluster 109 for all the flows comprising a session or unit of work. This will be referred to as the "sticky routing" problem.

In the present document, a "session" is defined as a series of related transactions to perform a unit of work. A session generally utilizes HTTP (hyper-text transport protocol) or HTTPS (secure hyper-text transport protocol) flows, consisting of one or more TCP/IP (transmission control protocol/Internet protocol) connections. A simple electronic commerce transaction typically consists of a sequence of related actions such as browsing an online catalog, selecting one or more items of merchandise, placing the order, providing payment and shipping information, and finally confirming or canceling the entire transaction. Information about the state of the session may span multiple TCP/IP connections, since information such as the client's identity, the item desired, the agreed-upon price, payment information, etc. must persist until the entire transaction is complete.

When a given client has a session with a particular server, state information about that session exists only at that particular server. In this case, a load balancer needs to apply extra intelligence to route the packets correctly. In particular, it needs to choose the same server repeatedly as the destination for all inbound packets from a given client for a given session or transaction. This client-server relationship will be referred to as "binding". To load-balance effectively over time, the system must also release the client's affinity for a particular server between sessions or transactions.

Formerly, a source IP address was unique enough to be used as a discriminator for this type of "sticky" routing. With the present technology, the source IP address is no longer useful as a routing token due to the widespread adoption of NAT (Network Address Translation) and SSL (Secure Sockets Layer). Network Address Translation (NAT) has been widely implemented by ISPs (Internet Service Providers) as a means of connecting the large number of home users to the Internet without using a larger number of registered addresses (since the registered addresses are a limited resource, hence expensive), and to protect the privacy of individual subscribers' IP addresses. The specifications for NAT are set out in the IETF's (Internet Engineering Task Force) RFC (Request for Comment) 1631. The NAT implementation places network address translators 503 at the borders of stub domains, as shown in FIG. 5. Each NAT box has a table consisting of pairs of local IP addresses and globally unique addresses. The IP addresses inside the stub domain are not globally unique. They are reused in other domains. The NAT can be installed without changes to the routers 501 or the hosts, thereby making it very attractive to rapidly growing ISPs.

The ISPs also use DHCP (Dynamic Host Configuration Protocol, RFC number xxxx) or PPP (Point-to-Point Protocol, RFC number xxxx) to dynamically assign private addresses to customer equipment, and use transparent proxies (for things such as the world-wide web, news and multimedia information) as a way of minimizing backbone traffic. NAT, DHCP/PPP and transparent proxies solved the addressing problems in expanding always connected home networks, reduced the costs of providers' backbones and helped restrain hackers from taking advantage of open ports to end-user equipment, but these steps resulted in the loss of the unique IP address for the user.

With the advent of NAT and transparent proxies, one can no longer safely assume that a single IP address applies to just one client. In fact, it is a goal of a NAT to conceal the host's true local IP address by substituting some constant IP address for the true IP address. NAT technology is commonly used in a device that connects a multiplicity of mobile clients to the Internet, such as a Wireless Access Protocol (WAP) gateway, and also appears in home networking devices such as a LAN router or smart hub or in modems for the home (3Comm's ISDN LAN modem is an example of a small router for the home incorporating NAT function). NAT devices and transparent proxies are also deployed by ISPs offering "always on" types of services such as those based on cable modem or Asymmetric Digital Subscriber Loop (ADSL) technology as well as in traditional dial-up "Point of Presence" (POPs).

The SSL-ID (Secure Sockets Layer Identifier) has also been tried as a solution to the sticky routing problem and failed. Connections using the SSL or TLS are encrypted. Once an SSL connection is established between a given client and a particular server, the SSL ID (a quasi-unique number) could be examined by the load-balancer and used for sticky routing purposes. Although the SSL standard always permitted either endpoint of the connection to repudiate the key agreement and force a renegotiation of SSL parameters and consequently the assignment of a new SSL-ID, in practice only servers did this, making the approach viable for a while. However, with the recent release of Microsoft Internet Explorer 5.0, this technique is no longer viable. Internet Explorer 5.0 is coded such that either the server or the client may repudiate the key agreement, making it impossible for a load-balancer to correlate the former SSL connection with the current one.

The next solution attempted for both of these problems employed "cookies". A cookie is a data object transported in variable-length fields within the HTTP header that is normally stored on the client, either for the duration of the session or permanently. A cookie stores certain data that the server application wants to remember about a particular client. This could include client identification, session parameters, user preferences, session state, or almost anything else an application writer can think of. Although a load-balancer with content-based routing could look into the HTTP header and route based on data contained in cookies, this initially promising solution also turned out to have a disastrous flaw. Certain clients are incapable of storing cookies.

These certain clients include webphone clients that access the Internet through a WAP gateway using the Wireless Session Protocol (WSP). WSP does not include cookies. Even if WSP supported cookies, the webphone clients are not capable of storing cookies due to their extremely limited memory. While it is possible for a wireless gateway product to store cookies on behalf of the wireless client (the IBM eNetwork Wireless Gateway does this; the Nokia WAP gateway does not), such functions in the gateway cannot be assumed, as is demonstrated above. In addition, with increasing privacy concerns about the use of cookies by unscrupulous advertisers to track an Internet user's surfing habits, many users are choosing to disable cookies altogether, or turn on cookie prompting, accepting cookies selectively, if at all. So the capability of storing persistent session information in cookies cannot be presumed.

SUMMARY OF THE INVENTION

The present invention enables sticky session persistence to a given server for individual clients, even if they have identical IP addresses, such as WAP phones accessing the network through a NAT gateway. It also restores web applications' ability to rely on the presence of cookies, which they had lost with the advent of "cookie-free" WAP phones. The present invention provides better support for robust, large-scale, reliable, highly-available electronic commerce installations serving all types of web clients, including Microsoft Internet Explorer 5.0 and the newer webphone and mobile devices that lack cookie support. The present solution can be delivered as a server platform-based service, without requiring any changes in existing web applications.

The present invention utilizes a modification to the Uniform Resource Locators (URLs) in a Hypertext Transport Protocol (HTTP) or Secure HTTP (HTTPS) document such that the URL uniquely identifies a given client and binds it to a particular server for the duration of a session. In addition to the modification to the URL, a "server-side cookie jar" is used which provides a data object accessible to a web application server. The cookie jar is used to store cookies on behalf of the particular client so that the clients or their client-side proxies will not be required to store them. Using the modified client-unique URL to identify a specific server, client, session and a cookie jar in an inbound web request, the request is routed to the appropriate server. The present invention will be described in greater detail with respect to a preferred embodiment below.

OBJECTS OF THE INVENTION

It is an object of the present invention to enable users of the Internet, unable or unwilling to store local cookies, or located behind a NAT or transparent proxy, to establish a session with a particular server in a cluster of servers front-ended by a dispatcher.

It is another object of the present invention to enable the server, in a set of dispatcher managed servers, to store information regarding the client.

It is a further object of the present invention to enable this session to occur by modifying the URL and requiring no unique modifications of the clients.

It is yet another object of the present invention to enable an entire transaction to occur between a client and one of a plurality of servers managed by a network dispatcher.

It is still a further object of the present invention to enable differentiated quality of service using the described methodology.

BRIEF DESCRIPTION OF THE DRAWINGS

FIG. 2 is a diagram of the changes to the URL for the present invention.

FIG. 3 is a flow diagram for the changes to the URL in the present invention.

DETAILED DESCRIPTION OF THE PREFERRED EMBODIMENT

Figure 1:
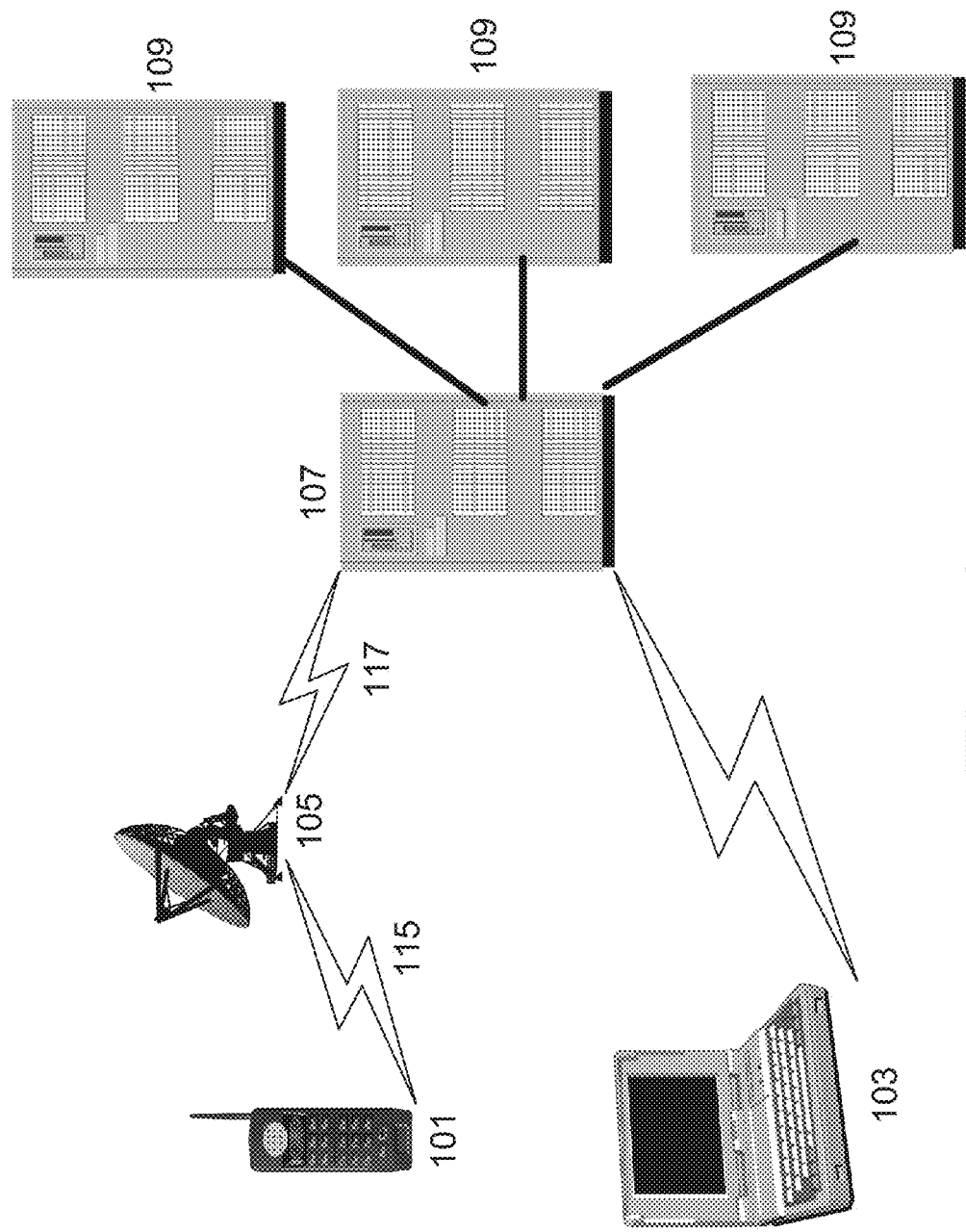
FIG. 1 is a pictorial representation of a minimal network in which the present invention can operate.

The above mentioned objectives, as well as others, will be described in detail with respect to a preferred embodiment of the present invention as well as to the Figures presented herein. Like numbers in the figures represent the same elements. The preferred embodiment is presented as an example only and is not meant to limit the stated invention or claims in any manner.

The preferred embodiment of the present invention utilizes a modification to the URL in an HTTP or HTTPS document such that the document uniquely identifies a given client and binds the client to a particular server for the duration of a session. In conjunction with the URL modification, a server-side cookie jar is implemented that enables the server to store cookies on behalf of a particular client. This releases the client or client-side proxies from the responsibility of storing the cookies. The cookie-jar approach renders the issue of cookie-storage on the client moot. Using the modified client-unique URL to identify a specific server, client, session and cookie jar in an inbound web request, the request is routed to the appropriate server where an inbound data stream filter restores the URL to its unmodified state, retrieves the appropriate cookie or cookies from the designated cookie-jar, and inserts them into the HTTP stream before passing the inbound request to the application (or to the next inbound data stream filter in the chain, if filter chaining is used). The inbound data stream filter must be the first or only filter to operate on the inbound data stream for the present invention to successfully accomplish its objective. A paired outbound filter, also resident on the web application server, receives the application-generated outbound data and headers, moves any cookies found in the headers into a specific cookie jar associated with the client's session, and converts certain URLs in the outbound web page to the modified form that will be described in detail below. The outbound data stream filter must be the last or only filter operating upon the outbound data stream.

The outbound data stream filter of the preferred embodiment inserts a string delineated with a forward slash character, the string preferably being formatted using modified Base64 encoding (the special characters "+" and "/" in the standard encoding would be replaced by "–" and "_" respectively), into the URL between the server portion and the path portion. Modified Base64 encoding is preferred so that arbitrary binary data in the inserted portion is represented as a series of legal URL path printable characters, although any means of accomplishing this is acceptable. An example of this is shown in FIG. 2. FIG. 2 shows the unmodified URL 201 as well as the modified URL 203. The string, hereafter called a "sticky routing token" 235, contains four fields:

1. A routing field identifying the specific server 207 to which the client session is bound. Preferably this routing field is the server's IP subnet address on the same IP subnet as the load-balancer, although other means of server identification are acceptable.
2. A date and time stamp 209. A fresh date-time stamp is inserted by the outbound filter into the outbound data stream. It is also inspected by the load balancer and the inbound data stream filter to determine if the binding relationship between the client and the server is stale.
3. A "key" 211 or index that can be used to select the proper cookie jar where cookies pertaining to the specific client-server binding are kept.
4. A checksum or hash 213 (such as a SHA-1 Secure Hash Algorithm) over fields 1-3 that can be checked to distinguish a valid sticky-routing URL from an unmodified URL.

The outbound filter registers to handle only certain MIME (Multi-Purpose Internet Mail) types (documents encoded using a structured markup language including but not limited to HTML, WML and XML). It does not register to handle "streaming media", image, or downloaded code MIME types.

Figure 4A:
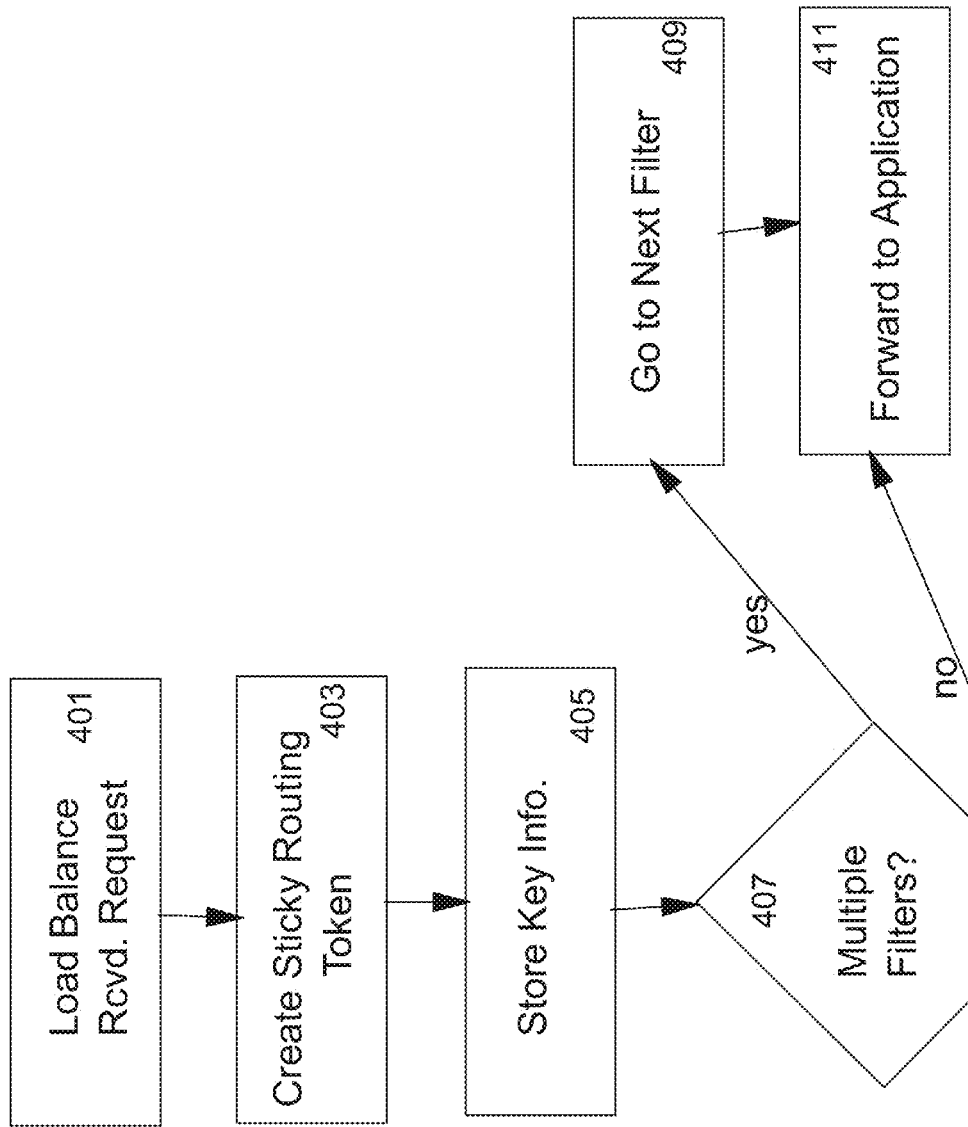
FIG. 4A depicts the logic flow for the receipt of information to the network dispatcher of the present invention.

Referring now to FIG. 4A, before a client-server binding is created, the load-balancer will see only a standard unmodified URL in the inbound data stream. The load balancer uses standard load-balancing technology, outside the scope of this discussion, to route this initial inbound request to the most appropriate server 401.

When this request arrives at the application server and no binding exists, the inbound data stream filter of the present invention creates a sticky routing token 403 for later insertion into the outbound data stream, as described above. The third field of the string is a new key that accesses a storage object in which cookies for the session can be stored 405. This key also serves to correlate the inbound and outbound streams associated with a given binding. In one preferred embodiment, the inbound filter creates a special cookie into which it inserts the just-created key and places this cookie into the header. This "key cookie" is used to store state information, namely the key itself, during the data passage from the inbound filter, to the application, and back to the outbound filter. Alternatively, the inbound filter can store the key in a connection control object associated with the TCP connection. Although exactly where the key is stored is not of particular importance to implementing the present invention, it is important to store the key in a place where it can later be retrieved by the outbound data stream filter in a manner that enables session correlation.

The inbound filter then forwards the data to the next filter in the chain 409 if there are multiple inbound filters 407, or directly the application 411 if there is only one inbound filter.

Figure 4B:
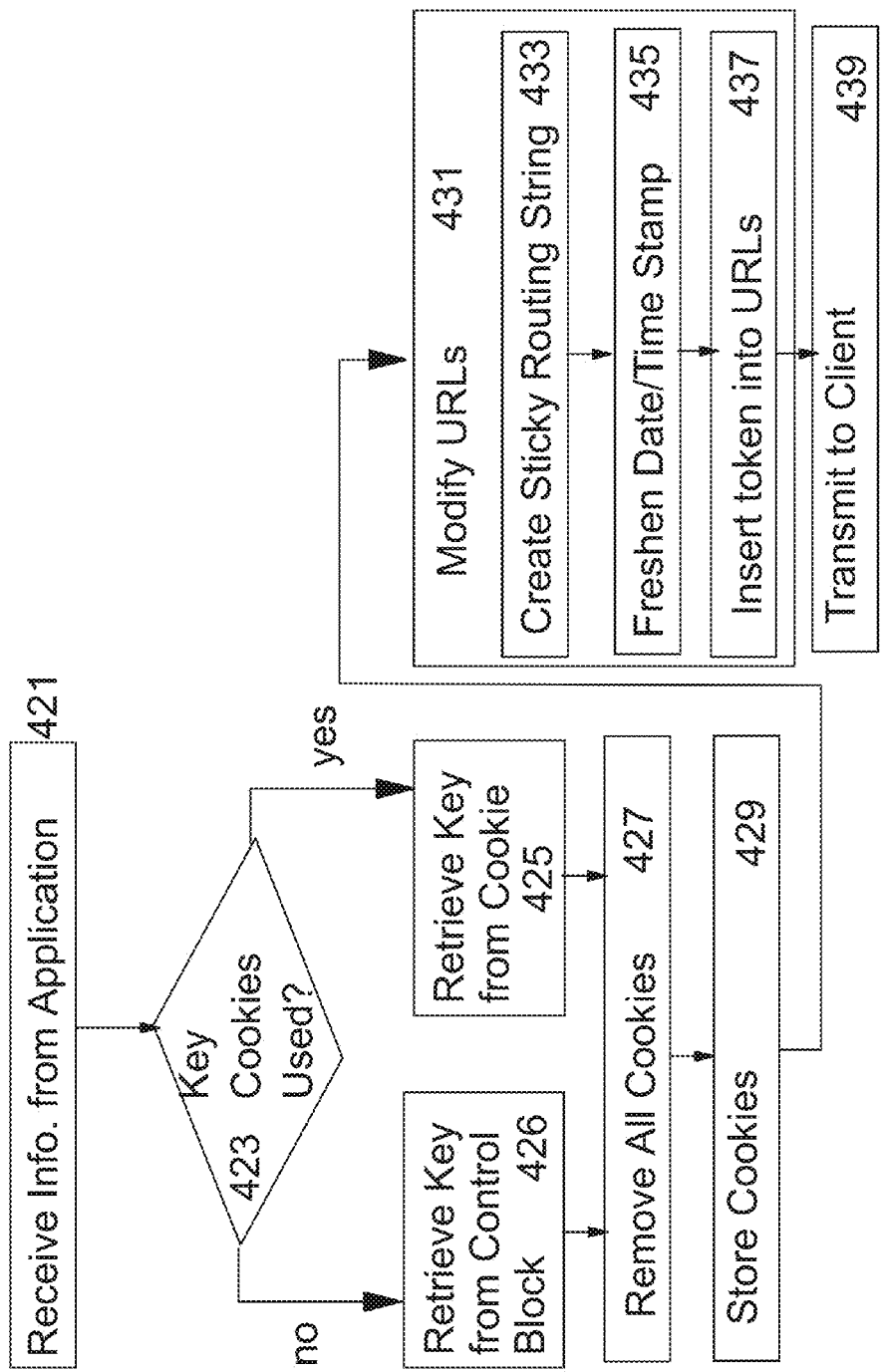
FIG. 4B depicts the logic flow for the receipt of information from the application.
Figure 5:
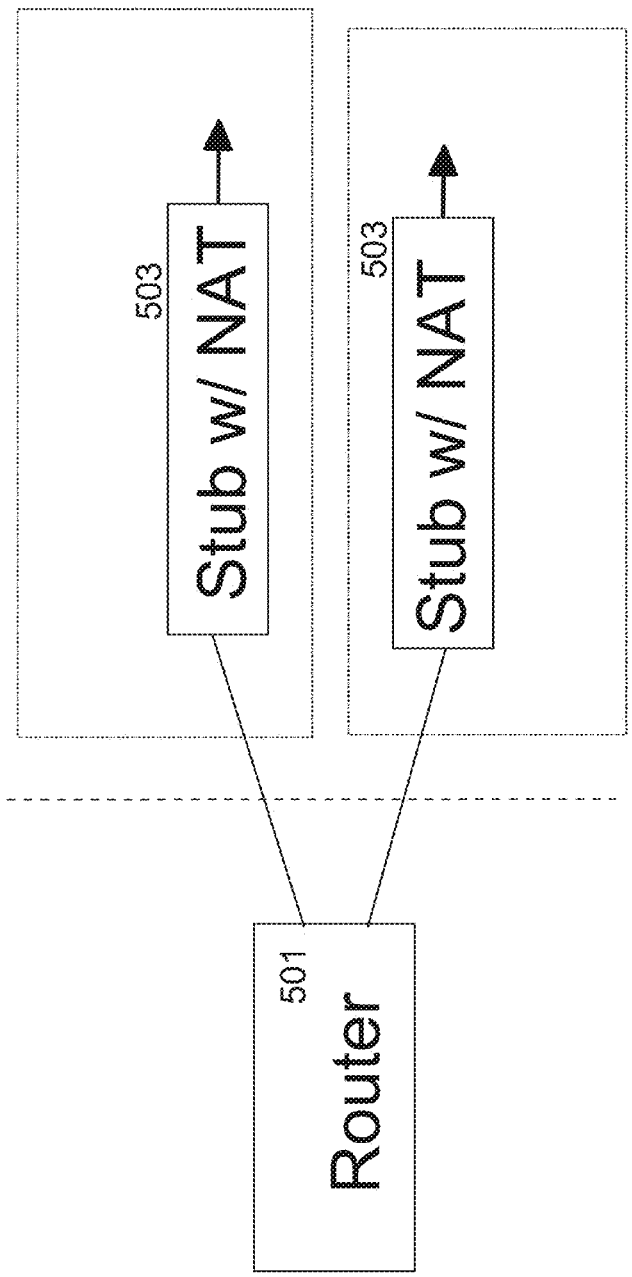
FIG. 5 demonstrates the use of Network Address Translators (NATs).
Figure 6:
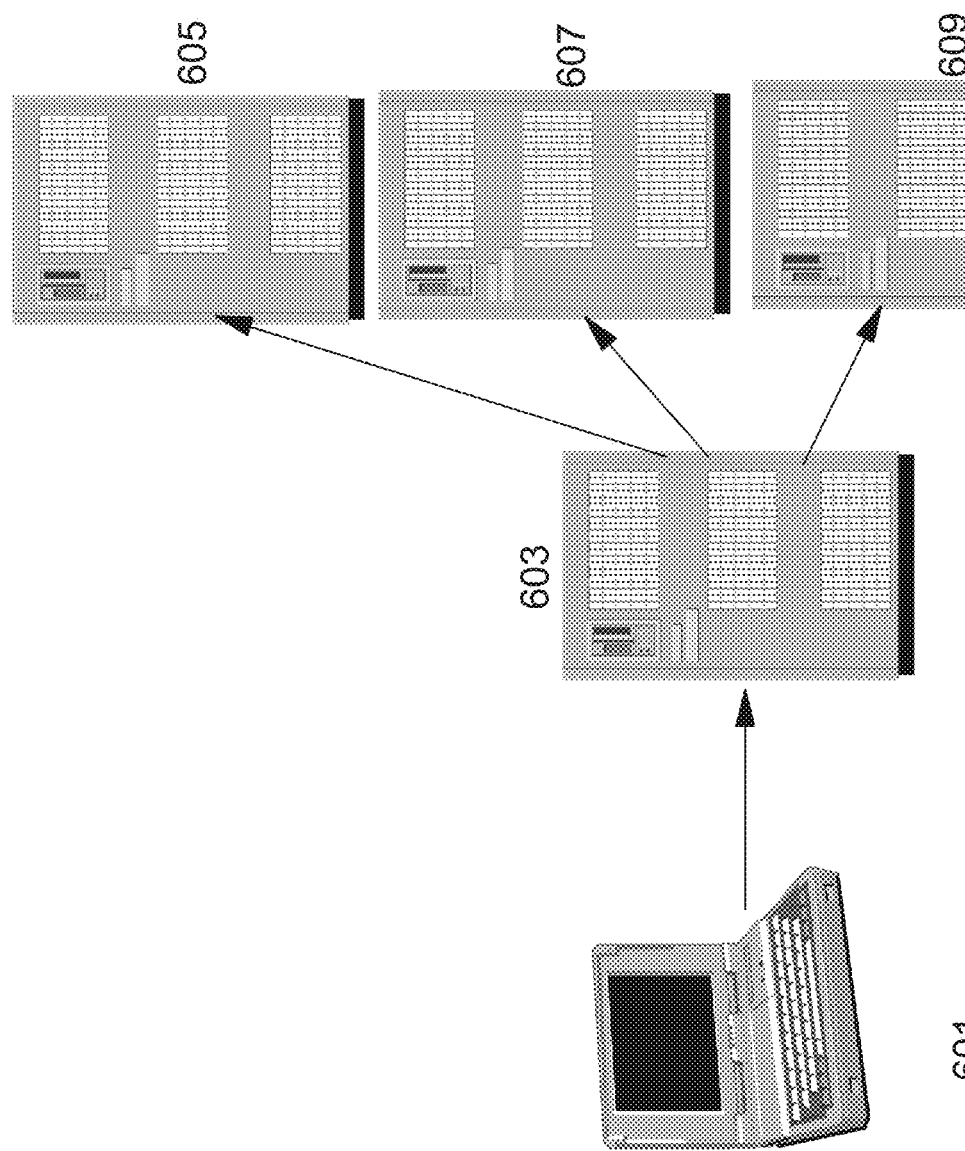
FIG. 6 shows how depicts how a typical network dispatcher would route information.

Referring now to FIG. 4B, after the application has processed the inbound data and created an outbound structured markup language stream, the outbound data stream filter of the present invention gains control 421. At this point the header may contain cookies in which the application has stored state information pertaining to the specific client. If the inbound filter had used the "key cookie" technique 423 described in the present invention to pass the key to the outbound filter, this key cookie will also be present in the header. The outbound filter retrieves the key for the session 425, removes all cookies 427 from the header, and stores them 429 in the cookie jar indexed by the key. It is important to note that outbound filter of the present invention could be implemented as part of a transcoding process, and should not significantly increase outbound data stream filtering path length if the data is already being parsed, formatted, and copied on the outbound data path during a transcoding operation.

Next, the outbound filter modifies zero or more of the URLs within the structured markup language document 431. All URLs referring to the same transaction need to be modified. In practice, all URLs referring to the particular server, or relative to that server, are modified. (Alternatively, a software-development tool could be provided enabling the application programmer to mark certain URLs as related to the transaction, in which case only those would be modified by the outbound filter; however this implementation is less preferred, due to its requirement that application programs be modified.) The outbound filter of the present invention creates the sticky routing string 433 mentioned above, and freshens the date-time stamp 435. The modification consists of inserting this sticky routing string into each of the selected URLs 437 (this process is sometimes called "URL-rewriting"). In the preferred embodiment, this might easily be achieved by invoking an existing URL-rewriting function with new parameters. (For additional information on the state of the art for URL-rewriting, see IBM WebSphere Application Server documentation at http://web/doc/whatis/icesessta.html. This document discusses the current state of the art in session-state correlation, cookie management, and URL-rewriting.)

Finally the output filter of the present invention passes the resulting stream to the network layer for transmission to the client 439.

When the client receives the modified HTTP stream, the user may select any one of the modified URLs, resulting in an inbound request containing a sticky routing token. The present invention is advantageous over prior art techniques that exploited optional or variable features of the protocol such as the source IP address, SSL-ID, or cookies, since the URL is mandatory HTTP content that cannot be removed, disguised, or made optional.

Referring once again to FIG. 3, the inbound request will arrive at a load-balancer 301. The load-balancer inspects the data to determine if a valid sticky routing token token is present 303. In the preferred embodiment, validation consists of comparing the embedded checksum or digital signature (hash, such as a SHA-1 hash) with a computed checksum or digital signature. If a valid sticky routing token is not present, it handles the packet as usual 305. The load balancer then tests the date-time stamp to determine if the session binding is stale. If the difference between date-time stamp and the present date-time exceeds some constant, the binding is considered stale and the data is processed as if no sticky routing field were present, i.e. preferably by applying existing load-balancing techniques to select a server to handle the request then creating a new session binding and a corresponding sticky routing field. In either event, the routing field in the token is used to route the packet to the identified server 313. Upon the packet's arrival at the application server, the inbound data stream filter gains control.

The inbound data stream filter validates the sticky routing token and date-time stamp in the same manner explained above. If the sticky routing token is valid and not stale, the inbound filter uses the key to access the cookie-jar where cookies for the particular client-server binding are stored. It removes the routing token and saves the key either in a key cookie or in the TCP connection control block, as described above. It inserts all the selected cookies into the header and forwards the data to either the next inbound filter, if any, or directly to the application.

The sticky routing token can also serve as the basis for a load-balancer to provide differentiated quality-of-service. By being able to recognize one particular client session or distinguish a transaction-in-process from one that has not yet started, appropriate decisions can be made to prioritize certain packets over others.

The present idea can also be extended so as to provide a high-availability implementation without substantially changing the underlying theory. To extent this, instead of a cookie-jar or object store per application server, instead there is a shared low-overhead Object Store accessible to all servers in the cluster (and, optionally, to the load-balancer).

Instead of storing the cookies in a cookie jar, cookies are stored in the shared object store. In addition to cookies, the application would be rewritten to store all of its vital state information concerning an ongoing session into the object store. The application would need to extract all of its state information from the object store upon receipt of any inbound data.

If multiple instances of the application are running on different servers in a cluster and a load-balancer routes inbound requests to different servers, each server will be capable of providing identical service to all other servers. Thus, in the event of an application crash or server failure, if the stored state information is intact and accessible, and an alternate server with sufficient capacity exists, the transaction can continue uninterrupted.

What is claimed is:

1. A method of establishing a persistent relationship between an end user device and a server where the server is one of a plurality of servers managed by a dispatcher and the end user device accesses the server using a uniform resource locator (URL), the method comprising the steps of:
   receiving at the dispatcher, a request for information from the end user device;
   determining by the dispatcher, which of the plurality of servers to select for satisfying the request;
   creating, at the selected server, a token comprising at least an identifier for the selected server, a data/time stamp, and a key, said key for accessing a server-side storage area for information regarding the persistent relationship and the end user device;
   inserting the token into the URL; and,
   sending, by the selected server to the client device, a response with the token inserted into the URL.

2. A method as claimed in claim 1 wherein said token is encoded using a modified Base64 encoding.

3. A method as claimed in claim 1 wherein said token has a checksum or hash verification field.

4. A method as claimed in claim 3 wherein said hash is a SHA-1 hash computed over said identifier for said selected server, said date/time stamp, and said key.

5. A method as claimed in claim 3 wherein said checksum or hash is encoded using a modified Base64 encoding.

6. A method as claimed in claim 1 wherein said information regarding said persistent relationship is stored as a cookie on said server.

7. A method of routing a request by an end user device to a particular one of a plurality of redundant servers residing behind a network dispatching mechanism, said method comprising the steps of:
   receiving, at the network dispatching mechanism, a request for information indicated by a uniform resource locator (URL);
   determining, at the network dispatching mechanism, if said URL contains a valid routing token;
   if said URL contains a valid routing token, further determining, at the network dispatching mechanism, if a session binding indicated by said routing token is old;
   if said URL contains a valid routing token and said routing token is not old, forwarding, by said network dispatching mechanism, the request, including the URL, to the particular server indicated by said valid routing token;
   removing, by said particular server, said valid routing information from the URL;
   storing, by said particular server, said routing information removed from said valid routing token, where said valid routing information can be accessed subsequently by an outbound data stream filter during the processing of an outbound reply related to said request;
   accessing, by said particular server, a server-side storage location where session information regarding a session between the particular server and the end user device is stored; and,
   inserting, by said particular server, said accessed session information into said request.

8. A method as claimed in claim 7 wherein additional filtering of the URL is done prior to the forwarding step.

9. A methods as claimed in claim 8 wherein all filtering is performed within the dispatcher.

10. A computer program product comprising a computer usable storage medium storing computer usable program code for establishing a persistent relationship between an end user device and a server where the server is one of a plurality of servers managed by a dispatcher and the end user device accesses the server using a uniform resource locator (URL), the computer usable program code, when executed by a computer, causes the computer to perform the steps comprising:

receiving at the dispatcher, a request for information from the end user device;

determining by the dispatcher, which of the plurality of servers to select for satisfying the request;

creating, at the selected server, a token comprising at least an identifier for the selected server, a data/time stamp, and a key, said key for accessing a server-side storage area for information regarding the persistent relationship and the end user device;

inserting the token into the URL; and, sending, by the selected server to the client device, a response with the token inserted into the URL.

11. A computer program product as claimed in claim 10 wherein said token is encoded using a modified Base64 encoding.

12. A computer program product as claimed in claim 10 wherein said token has a checksum or hash verification field.

13. A computer program product as claimed in claim 12 wherein said hash is a SHA-1 hash computed over said identifier for said selected server, said date/time stamp, and said key.

14. A computer program product as claimed in claim 12 wherein said checksum or hash is encoded using a modified Base64 encoding.

15. A computer program product as claimed in claim 10 wherein said information regarding said persistent relationship is stored as a cookie on said server.

16. A computer program product comprising a computer usable storage medium storing computer usable program code for routing a request by an end user device to a particular one of a plurality of redundant servers residing behind a network dispatching mechanism, said computer usable program code, when executed by a computer, causes the computer to perform the steps comprising:

receiving, at the network dispatching mechanism, a request for information indicated by a uniform resource locator (URL);

determining, at the network dispatching mechanism, if said URL contains a valid routing token;

if said URL contains a valid routing token, further determining, at the network dispatching mechanism, if a session binding indicated by said routing token is old;

if said URL contains a valid routing token and said routing token is not old, forwarding, by said network dispatching mechanism, the request, including the URL, to the particular server indicated by said valid routing token;

removing, by said particular server, said valid routing information from the URL, storing, by said particular server, said routing information removed from said valid routing token, where said valid routing information can be accessed subsequently by an outbound data stream filter during the processing of an outbound reply related to said request;

accessing, by said particular server, a server-side storage location where session information regarding a session between the particular server and the end user device is stored; and, inserting, by said particular server, said accessed session information into said request.

17. The computer program product as claimed in claim 16 wherein additional filtering of the URL is done prior to the forwarding step.

18. A computer program product comprising a computer usable storage medium storing computer usable program code for sending information to a requesting end user from an application over a session wherein said application resides at one of a plurality of redundant servers residing behind a network dispatcher, said computer usable program code, when executed by a computer, causes the computer to perform the steps comprising:

receiving response information from said application, said response information including a URL (uniform resource locator);

determining if a server-side key cookie has been used for storing session information between said end user and said application;

if a server-side key cookie has been used for storing session information, retrieving a session key from said key cookie;

if a key cookie was not used for storing session information, retrieving said session key from a control block;

removing all cookies from said response information;

storing said removed cookies in a predetermined server-side storage area;

updating said URL to indicate the removal of said cookies;

creating a sticky routing string;

updating a date/time stamp in said sticky routing string;

inserting said sticky routing string into said URL; and, transmitting said response information, including said URL to said end user.

19. A computer program product as claimed in claim 18 wherein, prior to said determining step, said response information is transmitted from said application through one or more filters.

20. A network dispatcher for establishing a persistent relationship between an end user device and a server where the server is one of a plurality of servers managed by said network dispatcher comprising:

means for receiving a request for information from said end user device, said request for information including a uniform resource locator (URL);

means for determining which of the plurality of servers to select for satisfying said request for information;

means for creating, at said selected server, a token comprising at least an identifier for the selected server, a date/time stamp, and a key, said key for accessing a server-side storage area for information regarding the persistent relationship and the end user device;

means for inserting the token into the URL; and, means for sending, by the selected server, a response with the token inserted into the URL to the client device.

21. A network dispatcher as claimed in claim 20 wherein said token is encoded using a modified Base64 encoding.

22. A network dispatcher as claimed in claim 20 wherein said token has a checksum or hash verification field.

23. A network dispatcher as claimed in claim 22 wherein said hash is a SHA-1 has computed over said identifier for said selected server, said date/time stamp, and said key.

24. A network dispatcher as claimed in claim 22 wherein said checksum or hash is encoded using a modified Base64 encoding.

25. A network dispatcher as claimed in claim 20 wherein said information regarding the persistent relationship is stored as a cookie on said server.

* * * * *